US007009972B2

(12) United States Patent
Maher et al.

(10) Patent No.: US 7,009,972 B2
(45) Date of Patent: Mar. 7, 2006

(54) MULTICAST IP ZONES FOR FAST SPANNING TREE CONVERGENCE IN WIDE-AREA PACKET NETWORK SYSTEMS

(75) Inventors: John W. Maher, Crystal Lake, IL (US); Patrick L. Harrington, Palatine, IL (US)

(73) Assignee: Motorola, Inc, Schaumburg, IL (US)

( * ) Notice: Subject to any disclaimer, the term of this patent is extended or adjusted under 35 U.S.C. 154(b) by 891 days.

(21) Appl. No.: 09/961,602

(22) Filed: Sep. 24, 2001

(65) Prior Publication Data

US 2003/0058857 A1  Mar. 27, 2003

(51) Int. Cl.
*H04L 12/56* (2006.01)
(52) U.S. Cl. .................... 370/390; 370/401; 370/408
(58) Field of Classification Search ................ 370/390, 370/400, 401, 256, 432, 408
See application file for complete search history.

(56) References Cited

U.S. PATENT DOCUMENTS

| 6,181,697 | B1 | 1/2001 | Nurenberg et al. | |
| 6,331,983 | B1 * | 12/2001 | Haggerty et al. | 370/400 |
| 6,408,000 | B1 * | 6/2002 | Lamberg et al. | 370/390 |
| 6,563,830 | B1 * | 5/2003 | Gershon et al. | 370/395.53 |
| 6,633,765 | B1 * | 10/2003 | Maggenti | 370/390 |

* cited by examiner

*Primary Examiner*—Ricky Ngo
*Assistant Examiner*—Richard Chang
(74) *Attorney, Agent, or Firm*—Indira Saladi; Terri S. Hughes; Steven R. Santema

(57) ABSTRACT

System and methods for confining multicast routing trees to within single zones of a multi-zone communication systems, thereby enabling faster convergence of the trees relative to trees spanning multiple zones. Separate multicast routing trees are established using different multicast addresses in a source zone and one or more listening zones. Packets for a call distributed by routers (104, 116) of a packet network within the source zone via a source zone multicast address are received by a source zone packet duplicator (132). The source zone packet duplicator forwards the packets, via routers (116, 118, 120, 122) of the packet network using unicast routing, to various listening zone packet duplicators (136, 138). The listening zone packet duplicators, upon receiving the packets, separately distribute the packets within their respective zones via the packet network using different multicast addresses of the listening zones. The source zone and listening zones may be redefined during the call as the source changes or moves to different zones.

21 Claims, 4 Drawing Sheets

US 7,009,972 B2

MULTICAST IP ZONES FOR FAST SPANNING TREE CONVERGENCE IN WIDE-AREA PACKET NETWORK SYSTEMS

FIELD OF THE INVENTION

This invention relates generally to communication systems, and particularly wide-area communication systems incorporating Internet Protocol (IP) multicast routing protocols.

BACKGROUND OF THE INVENTION

Communication systems typically include a plurality of communication devices, such as mobile or portable radio units, dispatch consoles and base stations (sometimes called base site repeaters) that are geographically distributed among various base sites and console sites. The radio units wirelessly communicate with the base stations and each other using radio frequency (RF) communication resources, and are often logically divided into various subgroups or talkgroups. Communication systems are often organized as trunked systems, where the RF communication resources are allocated on a call-by-call basis among multiple users or groups. Wide-area trunked systems are sometimes organized into a plurality of "zones," wherein each zone includes multiple sites and a central controller or server ("zone controller") for allocating communication resources among the multiple sites.

Next generation communication systems have begun to use Internet Protocol (IP) multicasting techniques to transport packet data representative of voice, video, data or control traffic between endpoints (or "hosts" in IP terminology). In such systems, host devices, including base stations, consoles, zone controllers, and in some instances, wireless mobile or portable radio units in different zones that desire to receive packets for a particular call, send Internet Group Management Protocol (IGMP) Join messages to their attached routers, causing the routers of the network to create a spanning tree of router interfaces for distributing packets for the call. Presently, there are two fundamental types of IP multicast routing protocols, commonly referred to as sparse mode and dense mode. Generally, in sparse mode, the spanning tree of router interfaces is pre-configured to branch only to endpoints having joined the multicast address; whereas dense mode employs a "flood-and-prune" operation whereby the spanning tree initially branches to all endpoints of the network and then is scaled back (or pruned) to eliminate unnecessary paths.

A problem that arises in IP multicast communication systems, most particularly in very large systems comprising hundreds of sites and/or zones, is that the multicast spanning tree is so large that the time and/or the amount of traffic generated by the selected multicast routing protocol to establish the spanning tree may adversely affect call set-up times or voice quality as each site competes for limited site bandwidth. It would be desirable to provide an apparatus and method for routing IP multicast packets in a multi-zone system in a manner that does not require multicast spanning trees to span multiple zones. Advantageously, the apparatus and method will provide for a plurality of multicast spanning trees each constrained within a single zone, thereby allowing the spanning trees to converge much more quickly than would be possible across multiple zones. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
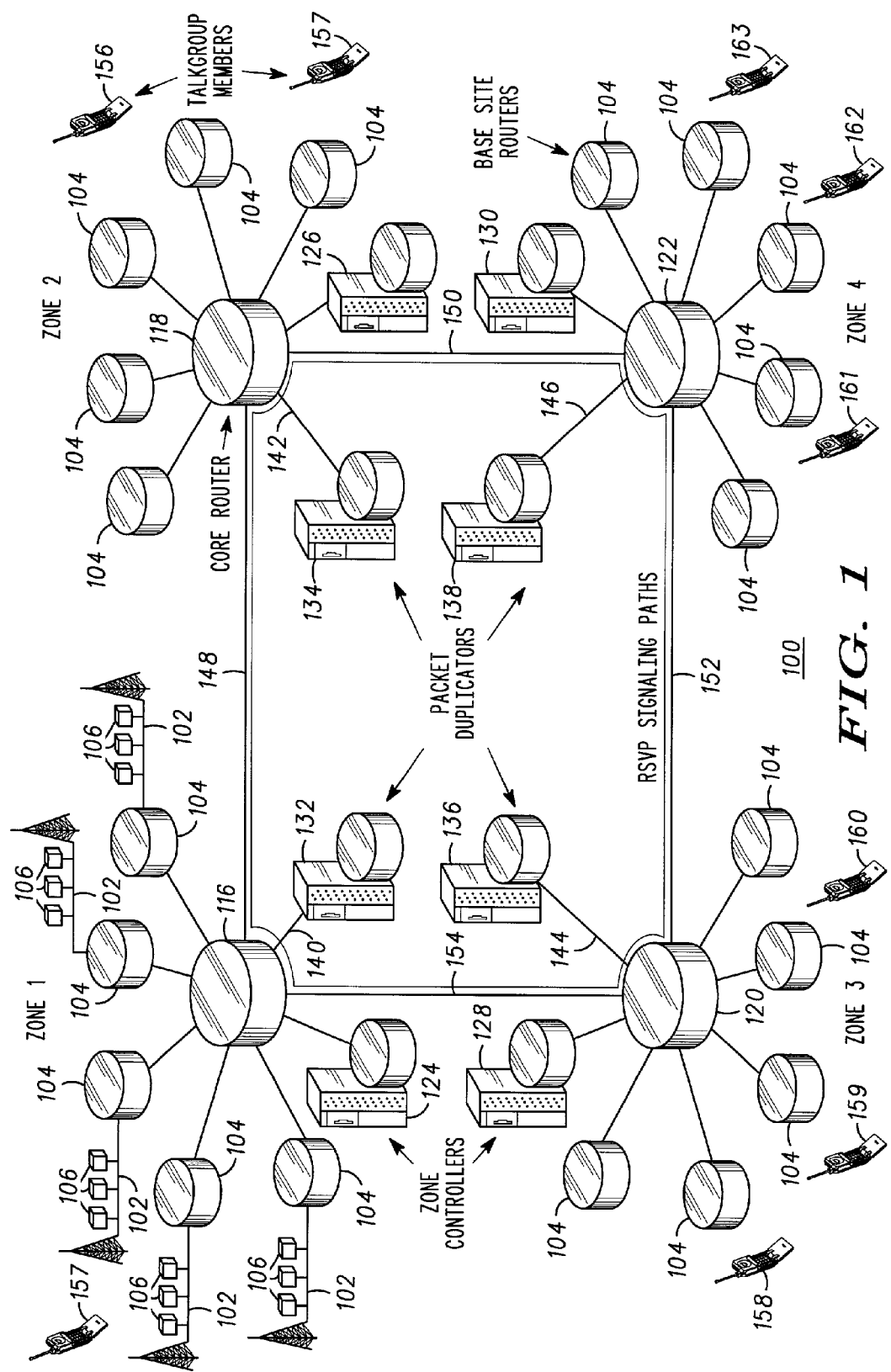
FIG. 1 shows a multi-zone packet-based communication system incorporating packet duplicators according to one embodiment of the invention.

FIG. 1 shows by way of example and not limitation, a packet-based communication system 100 comprising a plurality of base sites 102 organized into a plurality of zones ("Zone 1" through "Zone 4"). For convenience, there is shown only four zones and five base sites per zone, although it will be appreciated that the communication system 100 may include hundreds of sites and/or zones. The base sites 102 are shown only at Zone 1, although it will be understood that base sites and/or console sites generally reside in every zone. The base sites 102 include base stations 106 for communicating via RF resources with wireless communication units (e.g., communication units 157–163) within their respective coverage areas, which communication units may roam from site to site and from zone to zone. The communication system 100 may also include consoles or infrastructure devices (not shown) including, for example, dispatch consoles, call loggers, site controller(s), comparator(s), telephone interconnect device(s), internet protocol telephony device(s), scanner(s) or gateway(s), as is known in the art. These devices are typically wireline devices, i.e., connected by wireline to the base site(s) or other infrastructure device(s) but may also be implemented as wireless devices.

The base sites 102 are logically coupled, via router elements 104 ("base site routers") to router elements 116, 118, 120, 122 ("core routers") associated with their respective zones. The base site routers 104 and the core routers 116, 118, 120, 122 are functional elements that may be embodied in separate physical devices or combinations of such devices. The core routers are logically connected via packet network (inter-zone) links 148, 150, 152, 154. The core routers 116, 118, 120, 122 are connected to respective zone controllers 124, 126, 128, 130 that perform call processing and mobility management functions for communication units within their respective zones.

Generally, the routers of the network comprise specialized or general purpose computing devices configured to receive IP packets from a particular host in the communication system 100 and relay the packets to other router(s) or host(s) in the communication system 100. The routers thereby define a packet network for routing packets between host devices of the communication system 100. As defined herein, host devices that are sources or recipients of IP packets representative of control or payload messages for a particular call (or call set-up) are "participating devices" for that call. The zones in which the participating devices are located are referred to as participating zones. The host devices may comprise routers, base stations 106, zone controllers 124, 126, 128, 130, consoles or generally any wireline device of the communication system 100. Recent advances in technology have also extended IP host functionality to wireless devices, in which case the wireless communication units 157–163 or other wireless devices may comprise host devices as defined herein. Each host device has a unique IP address. The host devices include respective processors (which may comprise, for example, microprocessors, microcontrollers, digital signal processors or combination of such devices) and memory (which may comprise, for example, volatile or non-volatile digital storage devices or combination of such devices).

Packets are distributed between hosts from point-to-point using IP unicast routing protocols or from point-to-multipoint (i.e., to groups of hosts) using IP multicast routing protocols. As will be described in greater detail in relation to FIGS. 2–4, the preferred embodiment of the present invention employs multicast routing trees that are established separately within each zone to obviate the need for multicast spanning trees spanning across multiple zones. Suitable multicast routing protocols may comprise sparse mode routing protocols such as the Core Based Tree (CBT) protocol or the Protocol Independent Multicast—Sparse Mode (PIM-SM) protocol, dense mode routing protocols such as the Distance Vector Multicast Routing Protocol (DVMRP), Protocol Independent Multicast—Dense Mode (PIM-DM) or the Multicast Open Shortest Path First (MOSPF) protocol. The multicast protocols may also differ from zone to zone.

According to principles of the present invention, the communication system 100 includes a plurality of packet duplicators 132, 134, 136, 138 associated with zones 1–4, respectively. The packet duplicators are functional hosts that may be embodied in separate physical devices or combinations of such devices. For example, the packet duplicators 132, 134, 136, 138 maybe implemented in one or more of the zone controllers 124, 126, 128, 130. Generally, as will be described in greater detail in relation to FIG. 2, each packet duplicator is adapted to receive any packets sourced within its own zone, duplicate the packets and send the duplicated packets to packet duplicators of other participating zones. In turn, the packet duplicators of the participating zones are responsible for distributing the packets within their respective zones. The packet duplicators communicate packets between themselves using IP unicast directed to the unique IP address of the recipient packet duplicator(s). The packet duplicators send and receive packets between host devices within their respective zones via multicast addresses which, in the preferred embodiment, differ from zone to zone. In this manner, communication of packets between zones is accomplished using IP unicast and communication within zones (i.e., intra-zone communication) is accomplished using IP multicast with separate multicast trees.

Figure 2:
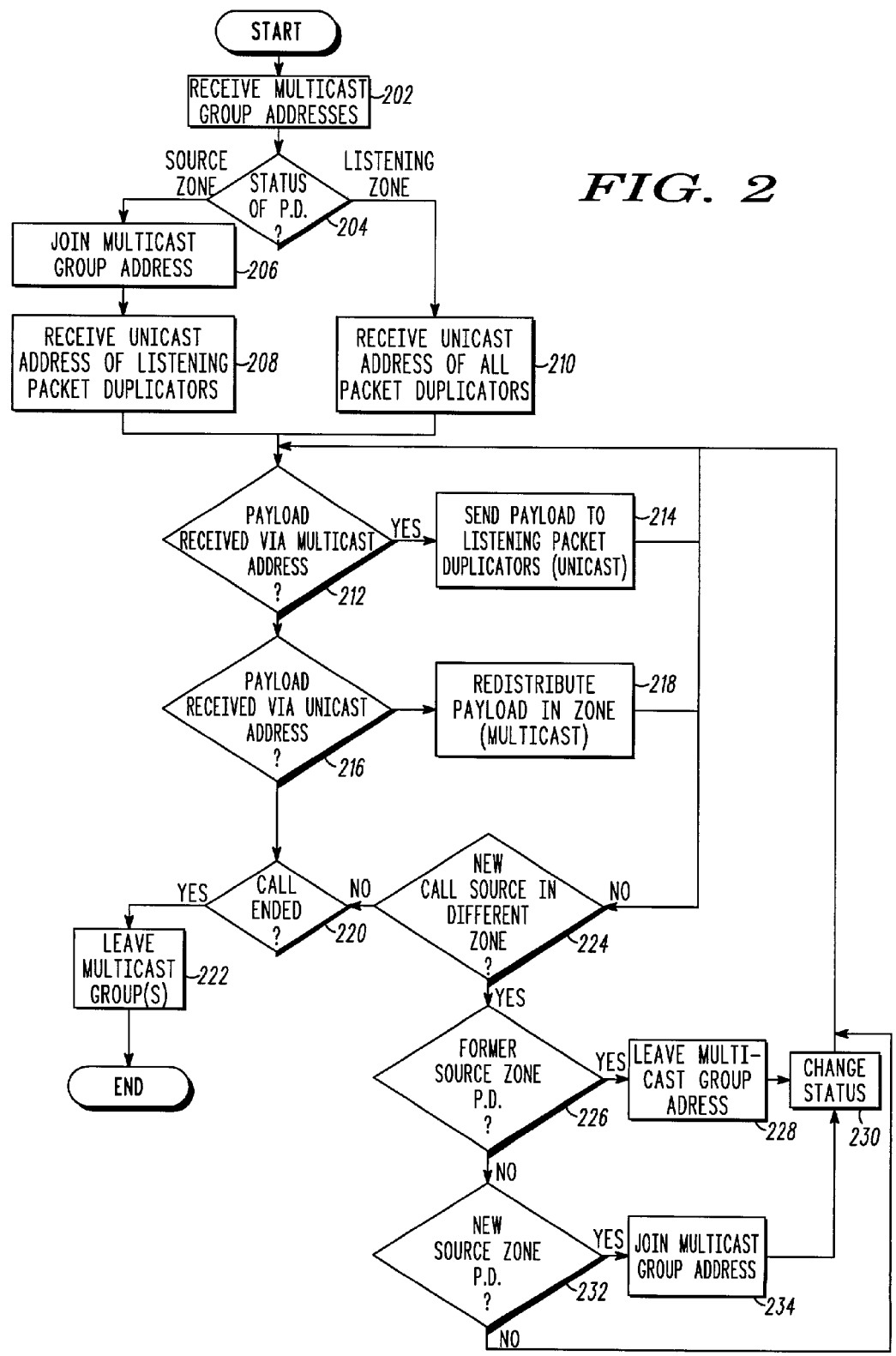
FIG. 2 is a flowchart showing steps performed by packet duplicators in implementing a talkgroup call in a multi-zone packet-based communication system according to one embodiment of the invention.

FIG. 2 shows steps performed by packet duplicators to implement a talkgroup call according to one embodiment of the invention. For convenience, the steps of FIG. 2 will be described with reference to FIG. 1, where communication unit 157 (zone 1) is a source and communication units 158–160 (zone 3) and 161–163 (zone 4) are recipients of a talkgroup call; and FIG. 4, which illustrates a message sequence for the call. Initially, at least, zone 1 defines a source zone and zones 3 and 4 define listening zones for the call. At step 202, participating packet duplicators receive multicast group addresses to be used within their respective zones. In the example of FIG. 1, packet duplicators 132 (zone 1), 136 (zone 3) and 138 (zone 4) are participating packet duplicators for the call.

Figure 4:
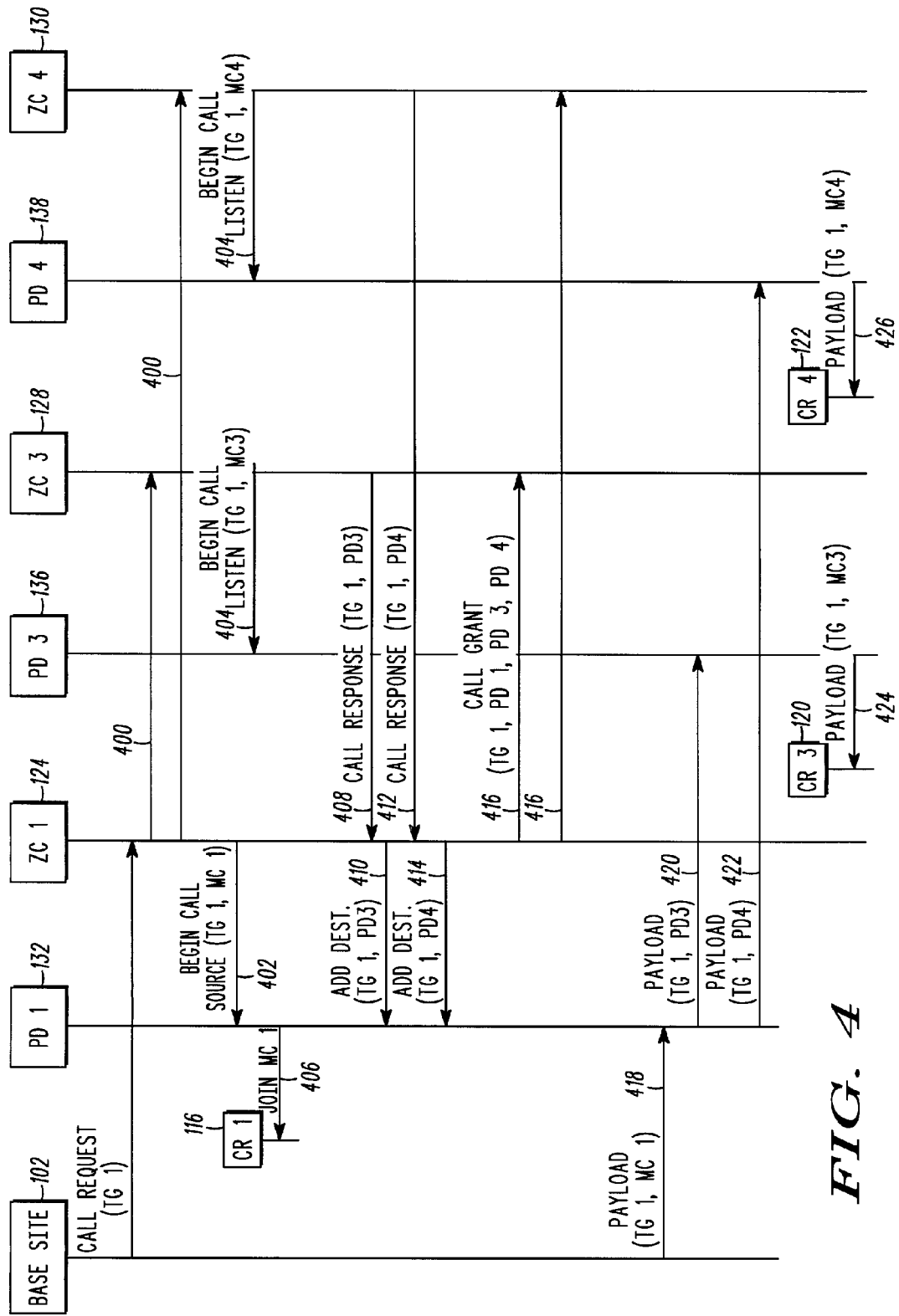
FIG. 4 is a message sequence chart illustrating an example multi-zone talkgroup call according to the invention.

In one embodiment, as best observed in FIG. 4, the multicast group addresses are determined dynamically by zone controllers of the participating zones upon receiving a call request 400 for a talkgroup call (e.g., TG1) from a base site of the prospective source (e.g., communication unit 157). In the preferred embodiment, the multicast group addresses differ for each participating zone (e.g., MC1 for zone 1, MC3 for zone 3, MC4 for zone 4), so that separate multicast trees will be established in each zone. Alternatively, the multicast group addresses may be statically determined and stored in memory of the packet duplicators and/or zone controllers of the respective zones. As shown in FIG. 4, the multicast group addresses are communicated to the participating packet duplicators in the form of a "Begin Call Source" message 402 (for the packet duplicator in the source zone) and "Begin Call Listen" messages 404 (for packet duplicators in listening zones).

FIG. 2, step 204 differentiates between the packet duplicator in the source zone and the packet duplicator(s) in listening zones. The packet duplicator in the source zone is defined as the packet duplicator in the zone that is to source payload for the call (or prospective call). Conversely, packet duplicator(s) in listening zone(s) are defined as packet duplicator(s) in zone(s) that are not, at least presently, sources of payload for the call. For example, with reference to FIG. 1, where communication unit 157 to source payload for the call, packet duplicator 132 (zone 1) is the source zone packet duplicator and packet duplicators 136 (zone 3) and 138 (zone 4) are listening zone packet duplicators, at least initially, for the call. In FIG. 4, the source zone packet duplicator 132 is referred to as "PD1" and the listening zone packet duplicators 136, 138 are referred to "PD 3" and "PD 4," respectively. As will be appreciated, the source zone and listening zone packet duplicators are subject to change periodically as different members of the talkgroup (i.e., in different zones) source payload for the call or as a sourcing device moves from zone to zone.

At step 206, the source zone packet duplicator joins the multicast group address for its zone, or the source zone multicast address. In one embodiment, this is accomplishd by the source zone packet duplicator sending IGMP Join messages to its attached core router. Thus, in the present example, packet duplicator 132 ("PD1") sends an IGMP Join message 406 for multicast group MC1 to its core router 116. Responsive to the Join message 406, the core router generates the multicast spanning tree in Zone 1 that allows PD1 to receive control or payload messages addressed to the source zone multicast group address MC1.

At step 208, the source zone packet duplicator receives the unicast address of listening packet duplicators. In the preferred embodiment, as best observed in FIG. 4, the unicast addresses are communicated to the zone controller of the source zone ("ZC1") from zone controllers ("ZC3," "ZC4") of the participating zones, in the form of respective "Call Response" messages 408, 412; and then communicated to the source zone packet duplicator ("PD1") in the form of "Add Destination" messages 410, 414. For convenience, the unicast addresses of the packet duplicators PD1, PD2, etc. in FIG. 4 are denoted by the same terms "PD1," "PD2," etc. as the packet duplicators themselves. Thus, in the example of FIG. 4, packet duplicator PD1 receives the unicast addresses PD3, PD4 of the listening packet duplicators PD3, PD4.

At step 210, the listening zone packet duplicators receives the unicast address of all participating packet duplicators. In one embodiment, as best observed in FIG. 4, the unicast addresses are communicated to the zone controllers ("ZC3," "ZC4") of the listening zones in the form of "Call Grant" messages 416. Thus, in the example of FIG. 4, the Call Grant messages 416 include the unicast addresses PD1, PD3, PD4 of all packet duplicators PD1, PD3, PD4 participating in the call.

Upon the sourcing communication unit (e.g., communication unit 157) sourcing payload for the call, the payload is eligible to be received by participating devices having joined the appropriate multicast address. In one embodiment, the sourcing communication unit (e.g., communication unit 157) sends payload to its associated site (e.g., base site 106) on an assigned RF channel, which the site or infrastructure then maps into payload addressed to the correct multicast address (e.g., MC1). Alternatively, the sourcing communication unit 157 itself may send payload traffic addressed to the multicast address MC1. In either case, the payload (represented in FIG. 4 by the reference numeral 418) is sent from the base site 106, via routers of the network, to participating devices having joined the source zone multicast address MC1, thereby defining a source zone multicast routing tree.

At step 212, it is determined whether payload is received by a packet duplicator via the source zone multicast address. In one embodiment, as has been described, the source zone packet duplicator (e.g., PD1) will have joined the source zone multicast address MC1 at step 206 but the listening zone packet duplicators PD3, PD4 will not have joined any multicast group address. Optionally, the listening zone packet duplicators may join their respective listening zone multicast addresses, but in any case do not join the source zone multicast address MC1. Thus, in the present example, PD1 is the only packet duplicator that is presently eligible to receive payload via the source zone multicast address MC1 at step 212. If the source zone packet duplicator (e.g., PD1) receives payload packets via the multicast address MC1 at step 212, it duplicates the packets if necessary and forwards the payload, via unicast messaging, to listening packet duplicators (e.g., PD3, PD4) at step 214. For example, as depicted in FIG. 4, the source zone packet duplicator PD1 sends a payload message 420 addressed to unicast address PD3 and a payload message 422 to unicast address PD4, so that the payload messages 420, 422 may be received by the respective packet duplicator PD3, PD4.

If, at step 212, payload is not received by a packet duplicator via the source zone multicast address, it is determined at step 216 whether payload is received by a packet duplicator via a unicast address. As has been described, listening packet duplicators (i.e., not having joined the source zone multicast address) are eligible to receive payload from the source zone packet duplicator via unicast addresses. If a listening zone packet duplicator (e.g., PD3, PD4) receives payload via unicast address PD3, PD4 at step 216, it re-distributes the payload to participating devices in its zone at step 218. In one embodiment, this is accomplished by the listening packet duplicators PD3, PD4 separately sending the payload, via multicast addresses MC3, MC4 of their respective zones, to their core routers CR3, CR4. For example, FIG. 4 shows packet duplicator PD3 sending a payload message 424 (addressed to the multicast address MC3) to CR3 and packet duplicator PD4 sending a payload message 426 (addressed to the multicast address MC4) to CR4. The core routers CR3, CR4, in turn, separately distribute the payload to devices in the listening zones having joined the listening zone multicast addresses MC3, MC4. In such manner, the core routers separately distribute the payload in the listening zones via separate multicast routing trees.

At step 220, it is determined whether the call is ended. This may occur, for example, if no call activity occurs for a designated "hang time" period as is well known in the art. If the call is ended, devices having previously joined multicast groups for the call (e.g., PD1, having joined MC1) leave their respective multicast groups at step 222. As is well known, this may be accomplished by the devices sending IGMP "Leave" messages to their attached routers. The routers, in turn, de-establish the appropriate multicast routing trees based on the Leave messages.

If, at step 220, the call is not ended, it is determined at step 224 whether there is a new call source in a different zone. This may occur, for example, if a communication unit sourcing payload for the call moves to a different zone, or if a communication unit in a different zone begins to source payload for the call. If there is not a new call source in a different zone (i.e., the source zone remains the same), the process returns to step 212 and the process continues with the same source zone packet duplicator and same source zone controller, until such time as the call ends at step 220 or the source zone changes at step 224.

If the source zone changes, the process proceeds to steps 226–234. At step 226, it is determined whether a packet duplicator is a former source zone packet duplicator; and at step 232, it is determined whether a packet duplicator is a new source zone packet duplicator. For purposes of illustration, suppose that communication unit 163 (zone 4) begins sourcing payload for the call. In such case, zone 4 replaces zone 1 as the sourcing zone for the call, packet duplicator 138 ("PD4") becomes the new source zone packet duplicator and packet duplicator 132 ("PD1") is the former source zone packet duplicator. The former source zone packet duplicator (e.g., PD1) leaves its associated multicast address (e.g., MC1) at step 228 and changes status to a listening zone packet duplicator at step 230. Conversely, the new source zone packet duplicator (e.g., PD4) joins its associated multicast address (e.g., MC4) at step 234 and changes status to a source zone packet duplicator at step 230. Upon the former source zone packet duplicator changing status to a listening zone packet duplicator, or the former listening zone packet duplicator changing status to a source zone packet duplicator, the process returns to step 212 with different source zone and/or listening zone packet duplicators, until such time as the call ends at step 220 or the source zone changes again at step 224.

If there is a new call source that does not result in different source zone and/or listening zone packet duplicators, the process returns to step 212 with the previous source zone packet duplicator and source zone controller, until such time as the call ends at step 220 or the source zone changes at step 224.

Figure 3:
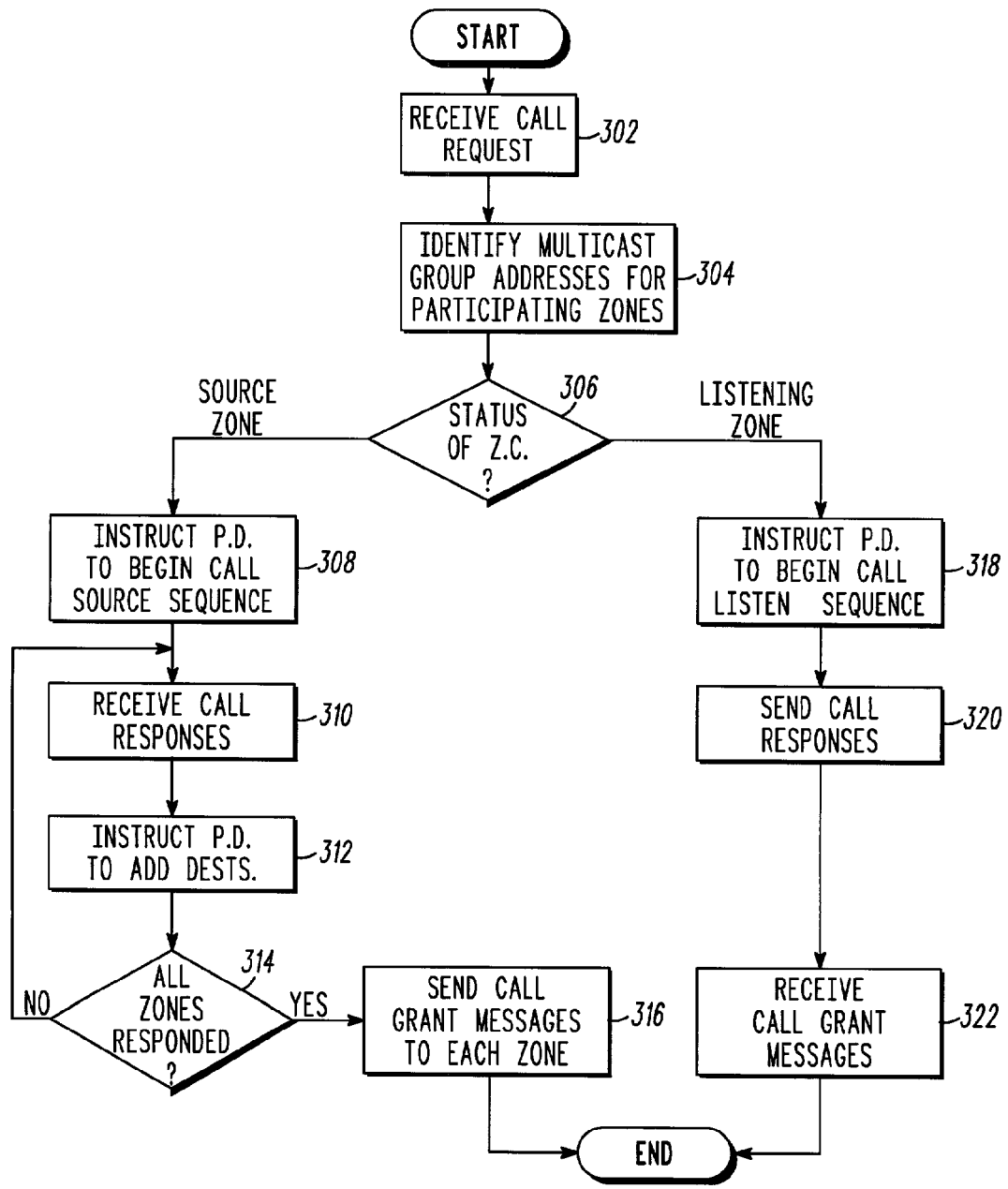
FIG. 3 is a flowchart showing steps performed by zone controllers in implementing a talkgroup call in a multi-zone packet-based communication system according to one embodiment of the invention.

FIG. 3 shows steps performed by zone controllers to implement a talkgroup call according to one embodiment of the invention. Generally, the steps of FIG. 3 are accomplished in concert with the steps of FIG. 2 (i.e., steps performed by packet duplicators) and similarly, will be described with reference to FIG. 1, where communication unit 157 (zone 1) is a source and communication units 158–160 (zone 3) and 161–163 (zone 4) are recipients of a talkgroup call; and FIG. 4, which illustrates a message sequence for the call. At step 302, participating zone controllers receive a call request for a talkgroup call. As best shown in FIG. 4, the call request 400 is initially sent to a controlling zone controller ("ZC1") from a base site 106 associated with the prospective source (e.g., communication unit 157), and the controlling zone controller ZC1 forwards the call request 400 to participating zone controllers (e.g., ZC3 and ZC4).

At step 304, the zone controllers identify multicast group addresses for their respective zones. In the preferred embodiment, the multicast group addresses differ for each participating zone (e.g., MC1 for zone 1, MC3 for zone 3, MC4 for zone 4), so that separate multicast trees will be established in each zone. Alternatively, the multicast group addresses may be statically determined and stored in memory of the packet duplicators and/or zone controllers of the respective zones.

FIG. 3, step 306 differentiates between the zone controller in the source zone and the zone controller(s) in listening zones. The zone controller in the source zone is defined as the zone controller in the zone that is to source payload for the call (or prospective call). Conversely, zone controller(s) in listening zone(s) are defined as zone controller(s) in zone(s) that are not, at least presently, sources of payload for the call. For example, with reference to FIG. 1, where communication unit 157 to source payload for the call, zone controller 124 (zone 1) is the source zone controller and zone controllers 128 (zone 3) and 130 (zone 4) are listening zone controllers, at least initially, for the call. In FIG. 4, the source zone controller 124 is referred to as "ZC1" and the listening zone controllers 128, 130 are referred to "ZC 3" and "ZC 4," respectively. As will be appreciated, the source zone and listening zone controllers are subject to change periodically as different members of the talkgroup (i.e., in different zones) source payload for the call.

At step 308, the source zone controller instructs the source zone packet duplicator to begin a call source sequence, in one embodiment by sending a "Begin Call Source" message 402 to the source zone packet duplicator. Thus, in the present example, the source zone controller 124 ("ZC1") sends a Begin Call Source message 402 to the source zone packet duplicator 132 ("PD1"). The Begin Call Source message identifies the talkgroup (e.g., "TG1") and the multicast address (e.g., "MC1") to be joined by the source zone packet duplicator and any other participating host devices in the source zone.

At step 318, the listening zone controller(s) instructs the listening zone packet duplicator(s) to begin a call listen sequence, in one embodiment by sending "Begin Call Listen" messages 404 to the listening zone packet duplicator(s). Thus, in the present example, zone controller 128 ("ZC3") sends a Begin Call Listen message 404 to packet duplicator 136 ("PD3") and zone controller 130 ("ZC4") sends a Begin Call Listen message 404 to packet duplicator 138 ("PD4"). The Begin Call Listen message(s) identify the talkgroup (e.g., "TG1") and the multicast addresses (e.g., MC3, MC4) to be joined by the respective listening zone packet duplicators and any other participating host devices in the listening zones.

At step 320, the listening zone controller(s) send call responses to the source zone controller. For example, as shown in FIG. 4, zone controllers ZC3, ZC4 send respective Call Response messages 408, 412 to the source zone controller ZC1. In the preferred embodiment, the call responses identify the talkgroup (e.g., TG1) and the unicast address(es) (e.g., PD3, PD4) of listening packet duplicators.

At step 310, the source zone controller receives the call responses. At step 312, the source zone controller instructs the source zone packet duplicator to add destinations for the call to which the source zone packet duplicator is to forward the payload. In the preferred embodiment, the instruction(s) to add destinations comprise instructions to forward the payload to one or more packet duplicators associated with the listening zones. For example, as shown in FIG. 4, the source zone controller ZC 1 first receives a call response 408 from ZC3 identifying the unicast address of packet duplicator PD3. Responsive to the call response 408, ZC1 sends an "Add Destination" message 410 instructing the source zone packet duplicator PD1 to add PD3 as a destination unicast address for the call. ZC1 next receives a call response 412 from ZC4 identifying the unicast address of packet duplicator PD4. Responsive to the call response 412, ZC1 sends an "Add Destination" message 414 instructing the source zone packet duplicator PD1 to add PD4 as a destination unicast address for the call. The source zone controller continues to receive call responses and instruct the source zone packet duplicator to add destinations until such time as all participating zones have responded at step 314 or until a suitable time period has elapsed without receiving any further responses.

Once all zones have responded, the source zone controller sends at step 316 call grant messages to each participating zone. At step 322, the listening zone controller(s) receive the call grant message(s). In the preferred embodiment, the call grant messages are sent, via respective unicast addresses, to the zone controllers of the participating zones. As has been described in relation to FIG. 2, the Call Grant messages 416 include the unicast addresses (e.g., PD1, PD3, PD4) of all packet duplicators participating in the call.

The present disclosure has identified methods for constraining the formation of multicast spanning trees to within single zones of multi-zone systems, thereby allowing the spanning trees to converge much more quickly than would be possible traversing multiple zones. The methods utilize packet duplicator and zone controller functions in each zone and are adapted to accommodate communication units roaming to different sites or zones during the duration of the call.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system organized into a plurality of participating zones for a call, a method comprising:

joining, by one or more recipient devices including at least a source zone packet duplicator, a multicast address associated with the source zone, defining a source zone multicast address;

establishing, by one or more network devices, a source zone multicast routing tree logically interconnecting the recipient devices having joined the source zone multicast address; and sending, from a communication source in the source zone to the one or more network devices, one or more packets addressed to the source zone multicast address;

distributing one or more packets for the call, within the source zone of the participating zones, via the source zone multicast routing tree;

receiving the packets by a host associated with the source zone;

forwarding the packets by the host associated with the source zone to one or more hosts associated with listening zones of the participating zones;

receiving the packets by the hosts associated with the listening zones; and separately re-distributing the packets within the listening zones via one or more separate listening zone multicast routing trees.

2. The method of claim 1, wherein the host associated with the source zone comprises a source zone packet duplicator, and wherein the hosts associated with the listening zones comprise listening zone packet duplicators.

3. The method of claim 1, wherein the step of distributing comprises delivering, by the network devices to the recipient devices, the one or more packets addressed to the source zone multicast address.

4. The method of claim 1 further comprising the steps of:
determining that the call has ended;
leaving, by the recipient devices, the source zone multicast address; and
de-establishing, by the one or more network devices, the source zone multicast routing tree.

5. The method of claim 1 further comprising the steps of:
redefining the source zone and listening zones, thereby defining a former source zone packet duplicator and a new source zone packet duplicator, a former source zone multicast address and a new source zone multicast address;
leaving, by the former source zone packet duplicator, the former source zone multicast address; and
joining, by the new source zone packet duplicator, the new source zone multicast address.

6. The method of claim 5, wherein the step of re-defining the source zone and listening zones is accomplished in response to payload for the call becoming sourced in the new source zone.

7. The method of claim 1, wherein the step of forwarding comprises:
sending, from a first host to one or more network devices, one or more packets addressed to secondary hosts; and
routing the packets from the one or more network devices to the secondary hosts.

8. The method of claim 7, comprising:
receiving, by the first host, unicast addresses of the secondary hosts, the step of sending comprising sending the one or packets to the unicast addresses.

9. In a communication system organized into a plurality of participating zones for a call, a method comprising:
distributing one or more packets for the call, within a source zone of the participating zones, via a source zone multicast routing tree;
receiving the packets by a host associated with the source zone;
forwarding the packets by the host associated with the source zone to one or more hosts associated with listening zones of the participating zones;
receiving the packets by the hosts associated with the listening zones;
joining, by recipient devices in different zones of the listening zones, different listening zone multicast addresses; and
establishing, by one or more network devices, the separate listening zone multicast routing trees logically interconnecting the recipient devices in the different listening zones having joined the different listening zone multicast addresses; and
separately re-distributing the packets within the listening zones via one or more separate listening zone multicast routing trees.

10. The method of claim 9, wherein the step of separately re-distributing comprises
separately sending, from the secondary hosts associated with the different listening zones to one or more network devices, one or more packets addressed to the different listening zone multicast addresses; and
delivering, by the network devices to the recipient devices in the different listening zones, the one or more packets addressed to the different listening zone multicast addresses.

11. The method of claim 9 further comprising the steps of:
determining that the call has ended;
leaving, by the recipient devices in the different zones, the different listening zone multicast addresses; and
de-establishing, by the one or more network devices, the separate listening zone multicast routing trees.

12. The method of claim 1 wherein the step of forwarding the packets further comprises forwarding the packets by the host to a source zone packet duplicator whereby the source zone packet duplicator forwards the packets to the hosts associated with the listening zones.

13. The method at claim 12 wherein the source zone packet duplicator forwards the packets to hosts associated with the listening zones by first sending the packets to a listening zone packet duplicator associated with the listening zones and the listening zone packet duplicator forwards the packets to the hosts associated with the listening zones.

14. The method of claim 9, wherein the host associated with the source zone comprises a source zone packet duplicator, and wherein the hosts associated with the listening zones comprise listening zone packet duplicators.

15. The method of claim 9 wherein the step of forwarding the packets further comprises forwarding the packets by the host to a source zone packet duplicator whereby the source zone packet duplicator forwards the packets to the hosts associated with the listening zones.

16. The method of claim 14 wherein the source zone packet duplicator forwards the packets to hosts associated with the listening zones by first sending the packets to a listening zone packet duplicator associated with the listening zones and the listening zone packet duplicator forwards the packets to the hosts associated with the listening zones.

17. The method of claim 9, wherein the step of distributing comprises delivering, by the network devices to the recipient devices, the one or more packets addressed to the source zone multicast address.

18. The method of claim 9 further comprising the steps of:
redefining the source zone and listening zones, thereby defining a former source zone packet duplicator and a new source zone packet duplicator, a former source zone multicast address and a new source zone multicast address;
leaving, by the former source zone packet duplicator, the former source zone multicast address; and
joining, by the new source zone packet duplicator, the new source zone multicast address.

19. The method of claim 18, wherein the step of re-defining the source zone and listening zones is accomplished in response to payload for the call becoming sourced in the new source zone.

20. The method of claim 9, wherein the step of forwarding comprises: sending, from a first host to one or more network devices, one or more packets addressed to secondary hosts; and
routing the packets from the one or more network devices to the secondary hosts.

21. The method of claim 20, comprising:
receiving, by the first host, unicast addresses of the secondary hosts, the step of sending comprising sending the one or packets to the unicast addresses.

* * * * *